United States Patent
Murata et al.

(10) Patent No.: US 6,743,512 B2
(45) Date of Patent: Jun. 1, 2004

(54) ADHESIVE FOR INORGANIC VAPOR-DEPOSITED FILM

(75) Inventors: Masaki Murata, Ohtsu (JP); Mitsuo Nishida, Ohtsu (JP); Katsuya Emoto, Chuo-ku (JP); Takeshi Yatsuka, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 37 days.

(21) Appl. No.: 10/096,900

(22) Filed: Mar. 14, 2002

(65) Prior Publication Data

US 2002/0168515 A1 Nov. 14, 2002

(30) Foreign Application Priority Data

Mar. 16, 2001 (JP) ........................... 2001-076498
Mar. 16, 2001 (JP) ........................... 2001-076499

(51) Int. Cl.⁷ ............................................. C08G 77/26
(52) U.S. Cl. ................. 428/423.1; 428/447; 528/26; 528/28; 528/38
(58) Field of Search ........................ 528/26, 28, 38; 428/423.1, 447

(56) References Cited

U.S. PATENT DOCUMENTS

| | | | |
|---|---|---|---|
| 3,915,935 A | * 10/1975 | Abraham et al. | 528/66 |
| 4,408,021 A | 10/1983 | Penn | |
| 4,628,076 A | * 12/1986 | Chang et al. | 525/440 |
| 4,888,399 A | * 12/1989 | Ryntz | 525/440 |
| 5,215,618 A | * 6/1993 | Schmalstieg et al. | 156/331.7 |
| 5,554,686 A | * 9/1996 | Frisch et al. | 524/588 |
| 5,939,188 A | * 8/1999 | Moncur et al. | 428/332 |
| 5,998,538 A | 12/1999 | Meckel et al. | |
| 6,194,523 B1 | * 2/2001 | Murata et al. | 525/438 |

FOREIGN PATENT DOCUMENTS

| | | |
|---|---|---|
| EP | 0 622 437 A1 | 11/1994 |
| FR | 78 36339 | 12/1978 |
| JP | 51-48511 | 12/1976 |
| JP | 62-101428 | 5/1987 |
| JP | 3070702 | 2/1994 |
| WO | WO 92/18577 | 10/1992 |

* cited by examiner

*Primary Examiner*—Margaret G. Moore
(74) *Attorney, Agent, or Firm*—Morrison & Foerster LLP

(57) ABSTRACT

There is provided an adhesive for inorganic vapor-deposited film which is characterized in containing a compounded product and/or a reacted product of polyurethane resin or polyester resin having a branch in a molecule with a silane coupling agent.

When the said adhesive is directly coated on an inorganic vapor-deposited film and adhered with a heat-sealing resin, a good adhesion is achieved. Also, when a packaging bag prepared by using the above is torn, a good tearing property is achieved.

17 Claims, 1 Drawing Sheet

ADHESIVE FOR INORGANIC VAPOR-DEPOSITED FILM

BACKGROUND OF THE INVENTION

FIELD OF THE INVENTION

The present invention relates to an adhesive which is suitable for an inorganic vapor-deposited film where a thin membrane layer of inorganic oxide is formed on a plastic film. More particularly, it relates to an adhesive used for a layered product of material for packaging which is requested to have an airtight property for packaging of foods, pharmaceuticals, chemicals, medical instruments, electronic parts and the like and is requested to be easily opened when the content is taken out.

BACKGROUND OF THE RELATED ART

With regard to a material for packaging having a barrier property to oxygen gas, vapor, etc. and having a good preserving adaptability, various things have been developed and proposed. For example, as a film having an excellent gas barrier property, there have been known a thing where aluminum is layered on a plastic film (Japanese Patent Laid-Open No. 62/101,428), a thing where vinylidene chloride or ethylene-vinyl alcohol copolymer is coated and a thing where a thin membrane such as silicon oxide or the like is layered (Japanese Patent Publication No. 51/48,511).

Further, in recent years, there have been proposed an inorganic vapor-deposited film having such a constitution that a vapor-deposited membrane of inorganic oxide such as silicon oxide, aluminum oxide or the like is formed on a flexible plastic material and a layered material, a container for packaging, etc. using the same (Japanese Patent No. 3,070,702 and others). Particularly, an inorganic vapor-deposited film having a vapor-deposited membrane of inorganic oxide such as silicon oxide, aluminum oxide or the like shows an excellent transparency, has a high barrier property to vapor, oxygen gas, etc., an aroma-keeping property and the like and further has less problem to environment upon being discarded as compared with the conventional layered material for packaging, etc. using aluminum foil, Nylon film coated with a resin of polyvinylidene chloride type, etc. whereby there has been a big expectation for its consumption as a packaging material and others.

However, when the inorganic vapor-deposited film is subjected to extruding and laminating process, dry laminating process or the like with film, sheet or the like of other resin having a heat sealing property by which a layered material for packaging is manufactured, there is a problem that adhesive force between the inorganic vapor-deposited film and the conventional adhesive for laminate, anchor coating agent, etc. is low. As a result of lowering of the laminate strength as such, it often happens in the layered material constituting a bag that, when the outer package of the packaging bag is opened for taking out the content, a part of film and heat-sealing resin of the packaging bag is elongated and is hard to tear whereupon the content comes out at a time and is scattered.

In order to improve the above-mentioned laminate strength, there is a method where a pretreatment such as a corona treatment is carried out but, in the case of inorganic vapor-deposited film, the effect is not so much noted or, rather, the vapor-deposited layer may be damaged whereby there is a possibility of deteriorating the barrier property. As to another method, there is proposed a method where a primer composition containing a silane coupling agent or a coating thin membrane by a polyester resin composition is formed on an inorganic vapor-deposited thin membrane and then adhesion is carried out using an adhesive for laminate. However, there is a problem that the product is at least in a four-layered structure of inorganic vapor-deposited film/coating coat/adhesive/heat-sealing resin and accordingly that the cost increases as compared with a product in a three-layered structure and that is less economical.

SUMMARY OF THE INVENTION

In view of the above-mentioned circumstances, an object of the present invention is to provide an adhesive for inorganic vapor-deposited film where a direct coating on an inorganic vapor-deposited film is possible, a good adhesion is achieved when adhered together with a heat-sealing resin, etc. and the heat-sealing resin is not elongated when the packaging bag prepared by using that is torn but a good tear with a united manner is possible.

In order to achieve the above-mentioned object, various studies have been conducted and it has been found that a good adhesion is achieved when an adhesive for inorganic vapor-deposited film containing a compounded product and/or a reacted product of silane coupling agent with polyurethane resin or polyester resin having a branch in a molecule is directly coated on an inorganic vapor-deposited film and adhered with a heat-sealing resin and that, when a packaging bag prepared by using the above is torn, a good tearing property is achieved. Thus, the present invention is an adhesive for inorganic vapor-deposited film as mentioned below.

(1) An adhesive for inorganic vapor-deposited film which is characterized in containing a compounded product and/or a reacted product of polyurethane resin having a branch in a molecule with a silane coupling agent.

(2) The adhesive for inorganic vapor-deposited film mentioned in (1), wherein the branch concentration of the polyurethane resin is 30–300 equivalents/ton.

(3) The adhesive for inorganic vapor-deposited film mentioned in (1) or (2), wherein the polyurethane resin contains 15–95% by weight of polyester polyol component having a glass transition temperature of 30° C. or higher when the total weight of the polyurethane resin is 100% by weight.

(4) An adhesive for inorganic vapor-deposited film which is characterized in containing a compounded product and/or a reacted product of polyester resin having a branch in a molecule with a silane coupling agent.

(5) The adhesive for inorganic vapor-deposited film mentioned in (1)–(4), wherein the silane coupling agent has an amino group.

(6) The adhesive for inorganic vapor-deposited film mentioned in (1)–(5), wherein a crosslinker of an isocyanate type is further compounded therewith.

DETAILED DESCRIPTION OF THE PREFERRED EMBODIMENTS

Figure 1:
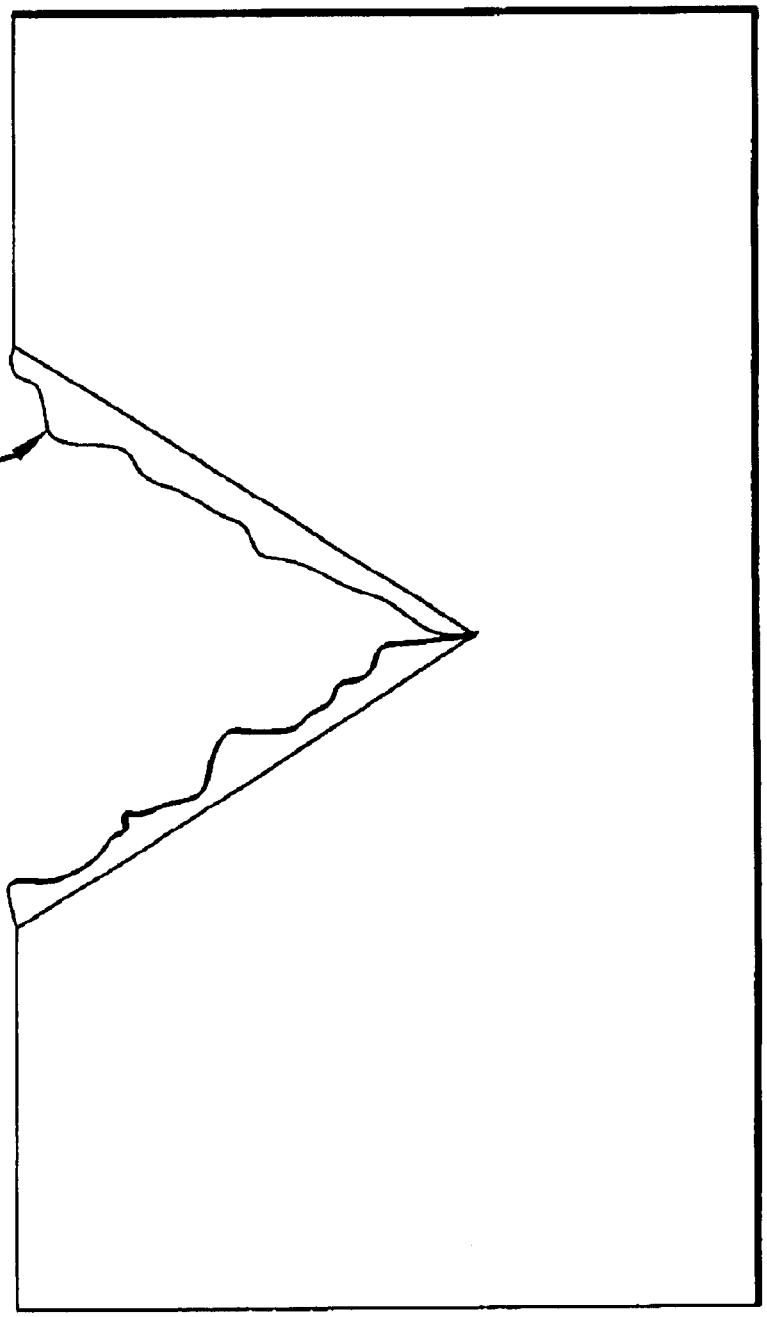
FIG. 1 shows elongation of a heat-sealing resin.

The present invention is an adhesive for inorganic vapor-deposited film containing a compounded product and/or a reacted product of a polyurethane resin or a polyester resin having a branch in a molecular with a silane coupling agent.

Although the polyurethane resin used in the present invention is nothing but a product prepared by a general method for the manufacture of polyurethane resin, there is used a polyurethane resin which has a branch in its molecule and which is prepared by the reaction of a chain extender and an organic isocyanate component using one or more polyol component(s) such as polyester polyol preferably containing 15–95% by weight of polyester polyol having a glass transition temperature of 30° C. or higher in the total polyol component when the total weight of the polyurethane resin is 100% by weight.

Glass transition temperature of the polyurethane resin is preferably from −30° C. to 50° C. More preferred lower limit is −20° C. and more preferred upper limit is 40° C. When the glass transition temperature is lower than −30° C., tearing property may lower while, when it is higher than 50° C., a good adhesion may not be achieved.

With regard to the polycarboxylic acid component of the polyester polyol copolymerized in the polyurethane resin used in the present invention, there are exemplified aromatic dibasic acids such as terephthalic acid, isophthalic acid, o-phthalic acid, 1,5-naphthalic acid, 2,6-naphthalic acid, 4,4'-diphenyldicarboxylic acid, 2,2'-diphenyldicarboxylic acid and 4,4'-diphenyl ether dicarboxylic acid; aliphatic and alicyclic dibasic acids such as adipic acid, azelaic acid, sebacic acid, 1,4-cyclohexanedicarboxylic acid, 1,3-cyclohexanedicarboxylic acid, 1,2-cyclohexanedicarboxylic acid, 4-methyl-1,2-cyclohexanedicarboxylic acid and dimer acid; and metal sulfonate-containing dicarboxylic acids such as 5-sodium sulfoisophthalate, 5-potassium sulfoisophthalate and sodium sulfoterephthalate. Terephthalic acid, isophthalic acid, o-phthalic acid, 2,6-naphthalic acid, adipic acid, 5-sodium sulfoisophthalate, etc. are particularly preferred in view of adhesive property, tearing property, economy in purchasing the material, etc.

With regard to the polyhydric alcohol component for the polyester polyol component copolymerized in the polyurethane resin used in the present invention, there are exemplified ethylene glycol, propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,3-pentanediol, cyclohexanedimethanol, neopentyl hydroxypivalate ester, adducts of bisphenol A with ethylene oxide and with propylene oxide, adducts of hydrogenated bisphenol A with ethylene oxide and with propylene oxide, 1,9-nonanediol, 2-methyloctanediol, 1,10-dodecanediol, 2-butyl-2-ethyl-1,3-propanediol and tricyclodecanedimethanol. Among them, ethylene glycol, propylene glycol, 2-methyl-1,3-propanediol, diethylene glycol, neopentyl glycol, cyclohexanedimethanol, etc. are preferred in view of adhesive property, tearing property, economy in purchasing the material, etc.

With regard to polyols, there are exemplified polyester polyols such as polycaprolactone, polyether polyol, polyether ester polyol and a mixture thereof in addition to the above-mentioned polyester polyols.

Examples of such a polyether polyol are polyether polyols which are obtained by polymerization of an oxirane compound such as ethylene oxide, propylene oxide, butylene oxide, tetrahydrofuran, etc. using water or a low-molecular polyol such as ethylene glycol, propylene glycol, trimethylolpropane, glycerin, etc. as an initiator.

Examples of the polyether ester polyol are polyether ester polyol which is prepared by the reaction of the above-mentioned polyether polyol with a dibasic acid such as terephthalic acid, isophthalic acid, adipic acid, azelaic acid or sebacic acid, dialkyl ester thereof or a mixture thereof.

In the polyurethane resin used in the present invention, it is preferred to use 15–95% by weight of polyester polyol having a glass transition temperature of 30° C. or higher when the total weight of the polyurethane resin is 100% by weight. More preferred lower limit is 25% by weight and more preferred upper limit is 75% by weight. When the amount of the polyester polyol having a glass transition temperature of 30° C. or higher is less than 15% by weight, a good tearing property may not be achieved while, when it is more than 95% by weight, that may cause a poor adhesion. The glass transition temperature of the polyester polyol is a value measured by a differential scanning calorimeter at the temperature rising rate of 20° C./minute.

Further, besides the polymer polyols which are mentioned hereinabove, it is also possible to use a chain extender with an object of adjusting, etc. of distribution of hard segment and soft segment and also of molecular weight of polyurethane prepolymer. Examples of the chain extender are diols such as ethylene glycol, propylene glycol, butylene glycol, diethylene glycol, dipropylene glycol, hexylene glycol, neopentyl glycol and cyclohexanedimethanol; polyfunctional alcohols such as glycerin and trimethylolpropane; and dimethylolalkanoic acid such as dimethylolpropionic acid and dimethylolbutanoic acid.

With regard to the organic diisocyanate component for the polyurethane resin used in the present invention, examples of the aliphatic isocyanate are trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6- diisocyanate methyl caproate.

Examples of the alicyclic isocyanate are 1,3-cyclopentene diisocyanate, 1,4-cyclohexane diisocyanate, 1,3-cyclohexane diisocyanate, 3-isocyanate methyl-3,5,5-trimethylcyclohexyl isocyanate (common name: isophorone diisocyanate), 4,4'-methylenebis(cyclohexyl isocyanate), methyl-2,4-cyclohexane diisocyanate, methyl 2,6-cyclohexane diisocyanate and 1,4-bis(isocyanate methyl) cyclohexane.

Examples of the aromato-aliphatic isocyanate are 1,3- or 1,4-xylylene diisocyanate or a mixture thereof, ω,ω'-diisocyanate 1,4-diethylbenzene and 1,3- or 1,4-bis(1-isocyanate 1-methylethyl) benzene or a mixture thereof.

Examples of the aromatic isocyanate are m-phenylene diisocyanate, p-phenylene dusocyanate, 4,4'-diphenyl diisocyanate, 1,5-naphthalene diisocyanate, 4,4'-diphenylmethane diisocyanate, 2,4- or 2,6-tolylene diisocyanate or a mixture thereof, 4,4'-toluidine diisocyanate and 4,4'-diphenyl ether diisocyanate.

It is necessary that the polyurethane resin used in the present invention has a branch in a molecule. Because of the presence of a branch in a molecular chain, the tearing property which is characteristic to the present invention is significantly improved. Although the reason why the tearing property is improved by the branch is not clear, it is presumed to be due to a possible improvement in cohesive force of the polyurethane resin. With regard to a method for its introduction, there may be utilized a product prepared by copolymerization of a part of a polyester polyol material with a compound of tri- or higher functional compound such as trimellitic acid anhydride, glycerin, trimethylolpropane or pentaerythritol in such an extent that the characteristics of the polyester diol such as solubility in organic solvents and operating ability for application are not deteriorated.

Alternatively, there may be used a tri- or higher functional polyol such as glycerin, trimethylolpropane or pentaerythritol as a part of a chain extender constituting the polyurethane resin. It is also possible that the isocyanate compound is made into a tri- or higher functional one. In view of control of the urethanization reaction, it is preferred that trimethylolpropane is added to a chain extender constituting the polyurethane resin to form a branch.

It is preferred that the branch concentration of the said polyurethane resin is within a range of 30–300 equivalents/ton (which means the equivalent numbers of the branch contained in one ton of the polyurethane resin). More preferably, the branch concentration is within a range of 50–300 equivalents/ton. When the branch concentration is less than 30 equivalents/ton, a good tearing property may not be achieved while, when it is more than 300 equivalents/ton, non-dissolved matters may be apt to be produced during the manufacture of the resin.

It is necessary that the polyester resin used in the present invention has a branch in its structure. As a result of the presence of the branch in a molecular chain, there is a significant improvement in the tearing property which is a characteristic of the present invention. Although the reason why the tearing property is improved by the branch is not clear, it is presumed to be due to an improvement in cohesive force of the polyester resin. With regard to a method for its introduction, there may be utilized a product prepared by copolymerization of a part of a polyester material with a compound of tri- or higher functional compound such as trimellitic acid anhydride, glycerin, trimethylolpropane or pentaerythritol in such an extent that the characteristics of the polyester such as solubility in organic solvents and operating ability for application are not deteriorated. It is preferred that the branch concentration is within a range of 30–300 equivalents/ton. When the branch concentration is less than 30 equivalents/ton, a good tearing property may not be achieved while, when it is more than 300 equivalents/ton, non-dissolved matters may be apt to be produced during the manufacture of the resin.

With regard to the composition for the polyester resin, there is no particular limitation for both acid component and glycol component but the same ones which are exemplified in the polyester polyol used as a material for the above polyurethane resin may be used.

With regard to the glass transition temperature of the polyester resin, that from −30° C. to lower than 50° C. is preferred in view of satisfying both adhesive force and tearing property and also of handling.

It is also necessary for the adhesive of the present invention for inorganic vapor-deposited film that the polyester resin or the polyurethane which is a main component contains a silane coupling agent by means of compounding and/or reaction. When a silane coupling agent is contained, a closely contacting property to an inorganic vapor-deposited film is improved whereby release of the vapor-deposited film hardly takes place upon tearing and, as a result, a tearing property is improved. Here, although the silane coupling agent may be added during the manufacture of urethane, it is preferred that the silane coupling agent is compounded with the adhesive immediately before use in view of stability of the adhesive and usable time.

With regard to the silane coupling agent, any substance may be used so far as it is represented by the structural formula R—S≡(X)$_3$ or R—Si≡(R')(X)$_2$ (in the formula, R is an organic group having vinyl group, epoxy group, amino group, imino group, isocyanate group or mercapto group; R' is a lower alkyl group; and X is methoxy group or ethoxy group) and its examples are aminosilanes such as N-β-(aminoethyl)-γ-aminopropyl trimethoxysilane and n-(dimethoxymethylsilylpropyl) ethylenediamine; epoxysilanes such as γ-glycydoxypropyl trimethoxysilane and γ-glycydoxypropyl triethoxysilane; and vinylsilanes such as vinyltriethoxysilane. Two or more of such silane coupling agents may be used jointly. A silane coupling agent having amino group, isocyanate group, epoxy group, etc. may also be made to react during the manufacture of the polyurethane resin. With regard to the silane coupling agent used, there is preferably used a silane coupling agent having amino group, isocyanate group and epoxy group and there is more preferably used a silane coupling agent having amino group. The use of a silane coupling agent having amino group is very much preferred since there is a tendency that a strong adhesion to the inorganic vapor-deposited surface is available. Its specific examples are γ-aminopropyl trimethoxysilane, γ-aminopropyl triethoxysilane, N-phenyl-γ-aminopropyl trimethoxysilane, N-β-(aminoethyl)-γ-aminopropyl trimethoxysilane, N-β-(aminoethyl)-γ-aminopropyl triethoxysilane and N-β-(aminoethyl)-γ-aminopropyl methyl dimethylsilane and it is also possible to use a hydrolyzed condensate of 3-triethoxysilyl-N-(1,3-dimethylbutylidene)-propylamine where amino group is blocked with ketone. With regard to a silane coupling agent having amino group, the preferred ones in view of economy in the purchase of materials, adhesive property and tearing property are γ-aminopropyl trimethoxysilane (A-1110 manufactured by Nippon Unicar) and γ-aminopropyl triethoxysilane (A-1100 manufactured by Nippon Unicar).

Content of the silane coupling agent to 100% by weight of the polyurethane resin or the polyester resin which is a main component is preferably from 0.05% by weight to 5.0% by weight. More preferably, it is from 1.0% by weight to 3.0% by weight. When it is less than 0.05% by weight, an adhesive property may lower while, when it is more than 5.0% by weight, a tearing property may lower.

It is preferred in the adhesive of the present invention for inorganic vapor-deposited film that a crosslinker of an isocyanate type is compounded therewith in an amount of 10–50% by weight to 100% by weight of the polyurethane resin or the polyester resin which is a main component. As a result of compounding the isocyanate crosslinker, there is an improvement in a closely contacting property to the heat-sealing resin and the inorganic vapor-deposited film and, even when a stress of tearing is applied, the three layers are united and detachment hardly takes place whereby the tearing is improved as a result thereof. Various properties such as heat resistance are improved as well. With regard to a method for preparation, it is preferred that a silane coupling agent is compounded with the polyurethane resin or the polyester resin, and then a crosslinker of an isocyanate type is compounded therewith because that is able to enhance the usable time of the adhesive.

With regard to the crosslinker of an isocyanate type, there may be used that of a common polyisocyanate such as aliphatic polyisocyanate, alicyclic polyisocyanate, aromatoaliphatic polyisocyanate, aromatic polyisocyanate and derivatives of those polyisocyanates.

With regard to the aliphatic polyisocyanate, there are exemplified aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanate methylcaproate; and aliphatic triisocyanates such as lysine ester triisocyanate, 1,4,8-triisocyanate octane, 1,6,11-triisocyanate undecane, 1,8-diisocyanate 4-isocyanate methyloctane, 1,3,6-triisocyanate hexane and 2,5,7-trimethyl-1,8-diisocyanate 5-isocyanate methyloctane.

With regard to the alicyclic polyisocyanate, there are exemplified alicyclic diisocyanates such as 1,3-cyclopentene diisocyanate, 1,4-cyclohexane diisocyanate, 1,3-cyclohexane diisocyanate, 3-isocyanate methyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate and 1,4-bis(isocyanate methyl) cyclohexane; and alicyclic triisocyanates such as 1,3,5-triisocyanate cyclohexane, 1,3,5-trimethylisocyanate cyclohexane, 2-(3-isocyanate propyl)-2,5-di(isocyanate methyl)-bicyclo(2.2.1)heptane, 2-(3-isocyanate propyl)-2,6-di(isocyanate methyl)-bicyclo(2.2.1)heptane, 3-(3-isocyanate propyl)-2,5-di(isocyanate methyl)-bicyclo(2.2.1) heptane, 5-(2-isocyanate ethyl)-2-isocyanate methyl-3-(3-isocyanate propyl)-bicyclo(2.2.1)heptane, 6-(2-isocyanate ethyl)-2-isocyanate methyl-3-(3-isocyanate propyl)-bicyclo (2.2.1)heptane, 5-(2-isocyanate ethyl) -2-isocyanate methyl-2-(3-isocyanate propyl)-bicyclo(2.2.1.)-heptane and 6-(2-isocyanate ethyl)-2-isocyanate methyl-2-(3-isocyanate propyl)-bicyclo(2.2.1)heptane.

With regard to the aromato-aliphatic polyisocyanate, there are exemplified aromato-aliphatic diisocyanates such as 1,3- or 1,4-xylylene diisocyanate or a mixture thereof, ω,ω'-diisocyanate 1,4-diethylbenzene, 1,3- or 1,4-bis(1-isocyanate 1-methylethyl)benzene or a mixture thereof; and aromato-aliphatic triisocyanates such as 1,3,5-triisocyanate methylbenzene.

With regard to the aromatic polyisocyanate, there are exemplified aromatic diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate or a mixture thereof, 4,4'-toluidine diisocyanate and 4,4'-diphenyl ether diisocyanate; aromatic triisocyanates such as triphenylmethane-4,4',4"-triisocyanate, 1,3,5-triisocyanate benzene and 2,4,6-triisocyanate toluene; and aromatic tetraisocyanates such as 4,4'-diphenylmethane-2,2',5,5'-tetraisocyanate.

With regard to the derivatives of the polyisocyanate, there are exemplified a dimmer, trimer, biuret and allophanate of the above-mentioned polyisocyanate, and a polyisocyanate having a 2,4,6-oxadiazinetrione ring prepared from the above-mentioned polyisocyanate and carbonic acid gas; and an adduct of the above-mentioned polyisocyanate with a low-molecular polyol having a molecular weight of less than 200 such as ethylene glycol, propylene glycol, diethylene glycol, butylene glycol, neopentyl glycol, 1,6-hexanediol, dipropylene glycol, cyclohexane dimethanol, triethylene glycol, 3-methyl-1,5-pentanediol, 3,3'-dimethylolheptane, glycerin, trimethylolpropane, pentaerythritol or sorbitol. Two or more of such polyisocyanates may be used jointly.

When the adhesive of the present invention for inorganic vapor-deposited film is used for adhesion of a compounded film for packaging of foods or pharmaceuticals, aliphatic polyisocyanates, alicyclic polyisocyanates, aromato-aliphatic polyisocyanates (compounds where aromatic ring and isocyanate group are bonded via an aliphatic group) and polyisocyanate derivatives thereof are preferred among the above-mentioned polyisocyanates in view of safety and hygiene.

In the manufacture of a multi-layered compounded film using the adhesive of the present invention for inorganic vapor-deposited film, it is possible to use a commonly used method such as that an adhesive is applied to an inorganic vapor deposited film using a dry laminator and adhered to a laminate substrate such as heat-sealing resin after evaporation of the solvent followed by heating to cure or conversely that the adhesive of the present invention is applied to the heat-sealing substrate, dried and adhered to the inorganic vapor-deposited film. There is another method where an adhesive is applied to an inorganic vapor-deposited film and, after evaporation of the solvent, the heat-sealing resin is extruded and laminated. When the applicability of the laminator is taken into consideration however, the first method is preferred. Amount of the adhesive at that time is preferably around 1–10 g/m$^2$ whereby both adhesive property and tearing property are satisfied. With regard to a laminate substrate for the heat-sealing resin at that time, there are exemplified low-density polyethylene (LDPE), medium-density polyethylene (MDPE), high-density polyethylene (HDPE), linear low-density polyethylene (LLDPE), polypropylene, copolymer of ethylene with vinyl acetate, copolymer of ethylene with acrylic acid, copolymer of ethylene with methacrylic acid, copolymer of ethylene with methyl acrylate, copolymer of ethylene with methyl methacrylate and ionomer and, among them, LLDPE is preferred in view of adhesive property.

EXAMPLES

The present invention will now be illustrated in more detail by the following examples although the present invention is not limited thereto. The expression of mere "part(s)" and in Synthetic Examples, Examples and Comparative Examples are all on the basis of weight unless otherwise mentioned.

Synthetic Example 1 for Polyurethane Resin

Into a reactor equipped with thermometer, stirrer, refluxing condenser and distilling pipe were charged 100 parts of polyester polyol (A) and 100 parts of polyester polyol (B) as mentioned in Table 1 as well as 5 parts of trimethylolpropane and 100 parts of ethyl acetate followed by dissolving at 60° C. To this were added 25 parts of 4,4'-diphenylmethane diisocyanate (MDI), the reaction was carried out at 75° C. for 7 hours and 53.3 parts of ethyl acetate were poured thereinto to adjust the solid concentration to 60% whereupon a solution of polyurethane resin (1) was obtained. Characteristics of the polyurethane resin are shown in Table 1.

Synthetic Examples 2–6 for Polyurethane Resin

Polyurethane resin was prepared using the materials shown in Table 1 by the same manner as in Synthetic Example 1. The silane coupling agent of Synthetic Examples 5 or 10 was added after addition of and reaction with the isocyanate and the reaction was further carried out at 75° C. for 6 hours. Synthetic Examples 6–8 are the cases where polyester diol having a glass transition temperature of 30° C. or higher is 30% by weight or less in the total diol components. Synthetic Examples 9 and 10 relate to urethane having no branch.

TABLE 1

| Composition and Characteristic of Resin | | Synth. Ex. 1 | Synth. Ex. 2 | Synth. Ex. 3 | Synth. Ex. 4 | Synth. Ex. 5 |
|---|---|---|---|---|---|---|
| Polyester polyols | Polyester (A) | 100 | 75 | 100 | 50 | 100 |
| | Polyester (B) | 100 | 125 | 100 | 150 | 100 |
| | Polyester (C) | | | | | |
| | Polyester (D) | | | | | |
| Chain Extenders | TMP | 5 | 3 | 5 | 5 | 5 |
| | Neopentyl glycol | | | | | |
| Silane Coupling Agents | γ-Isocyanate propyl triethoxysilane | | | | | 2.5 |
| Diiso- Cyanates | MDI | 25 | 20 | | 25 | |
| | IPDI | | | 25 | | 25 |
| Branch Concentration (eq/ton) | | 162 | 100 | 162 | 162 | 160 |
| Diol Component having Glass Transition Temperature of 30° C. or higher (%) | | 43 | 34 | 43 | 22 | 43 |
| Glass Transition Temperature of Resulting Polyurethane (° C.) | | 10 | −10 | 5 | −20 | 10 |

| Composition and Characteristic of Resin | | Synth. Ex. 6 | Synth. Ex. 7 | Synth. Ex. 8 | Synth. Ex. 9 | Synth. Ex. 10 |
|---|---|---|---|---|---|---|
| Polyester polyols | Polyester (A) | | | 30 | 100 | 100 |
| | Polyester (B) | | 100 | 20 | 100 | 100 |
| | Polyester (C) | 200 | | | | |
| | Polyester (D) | | 100 | 150 | | |
| Chain Extenders | TMP | 5 | 5 | 0.5 | | |
| | Neopentyl glycol | | | | 5 | 5 |
| Silane Coupling Agents | γ-Isocyanate propyl triethoxysilane | | | | | 2.5 |
| Diiso- Cyanates | MDI | 25 | 25 | 20 | 25 | 25 |
| | IPDI | | | | | |
| Branch Concentration (eq/ton) | | 162 | 162 | 17 | 0 | 0 |
| Diol Component having Glass Transition Temperature of 30° C. or higher (%) | | 0 | 0 | 14 | 43 | 43 |
| Glass Transition Temperature of Resulting Polyurethane (° C.) | | 10 | −40 | −20 | 10 | 10 |

Abbreviations in the tables are as follows.
Polyester polyols
Polyester (A): terephthalic acid/isophthalic acid//ethylene glycol/neopentyl glycol (molar ratio: 50/50//50/50; glass transition temperature: 53° C.; number-average molecular weight: 2,000)
Polyester (B): adipic acid/neopentyl glycol/hexanediol (molar ratio: 100/50/50; glass transition temperature: −60° C.; number-average molecular weight: 2,000; ODX 688 [trade name] manufactured by Dainippon Ink and Chemicals)
Polyester (C): terephthalic acid/isophthalic acid/adipic acid//ethylene glycol/neopentyl glycol (molar ratio: 30/30/40//50/50; glass transition temperature: 5° C.; number-average molecular weight: 2,000)
Polyester (D): terephthalic acid/isophthalic acid/adipic acid//2-methyl-1,3-propanediol/1,4-butanediol (molar ratio: 30/30/40//50/50; glass transition temperature: −10° C.; number-average molecular weight: 2,000)
Chain Extenders
TMP: trimethylolpropane Diisocyanate
MDI: diphenylmethane diisocyanate
IPDI: isophorone diisocyanate Chain Extenders TMP: trimethylolpropane Diisocyanate MDI: diphenylmethane diisocyanate IPDI: isophorone diisocyanate The above-mentioned polyurethane, silane coupling agent and polyisocyanate as a crosslinker were compounded to prepare the adhesives (Examples 1–5 and Comparative Examples 1–5) for inorganic vapor-deposited film.

The adhesives for inorganic vapor-deposited film prepared as such were used to prepare a compounded film comprising three layers of film having a thickness of 15 μm (trade name: VN 200 manufactured by Toyobo) where two-element oxide thin membrane of silicon oxide and aluminum oxide were vapor-deposited on a biaxially elongated Nylon film/the adhesive for inorganic vapor-deposited film/heat-sealing resin LLDPE (thickness: 40 μ; trade name: LiX2 manufactured by Toyobo) by the following method and each of the compounded films was subjected to an adhesion test, a sealing strength test and a tearing test.

The compounded film comprising the three layers was prepared by the following method. Thus, an adhesive for inorganic vapor-deposited film described in each of Examples and Comparative Examples as described in Table 2 was firstly applied at room temperature to an inorganic vapor-deposited film using a laminator, the solvent was evaporated by heating and the applied surface was adhered to LLDPE at 60° C. After that, the laminated film was aged at 40° C. for three days to cure the adhesive for inorganic vapor-deposited film and then subjected to the following evaluation tests.

1) Test for Adhesive Property:

A test piece in a size of 300 mm length×15 mm width was prepared from the above-prepared compounded film and an adhesive strength was measured by a 900 release test at a release rate of 200 mm/minute using an Instron tension tester. The measured value was shown by a mean value of adhesive strengths (mN/15 mm) between the inorganic vapor-deposited film and the LLDPE for five test pieces.

2) Test for Sealing Strength:

Two sheets of the compounded film prepared as above were heat-sealed under the condition of 160° C. for 3 seconds where two LLDPE layers were adhered, a test piece in a size of 15 mm width was prepared from the sealed area thereof and an adhesive-strength was measured by a T-type release test method at a release rate of 200 mm/minute using an Instron tension tester. The measured value was shown by a mean value of sealing strengths (N/15 mm) for five test pieces.

3) Test for Tearing Property:

A cut of 5 mm was formed at the edge of the compounded film and torn by hand and its feel upon tearing was evaluated. The criteria therefor were as follows. Thus, "oo" means "torn with a united feel without resistance"; "o" means "a little resistances were noted and, although the heat-sealing resin (LLDPE in that case) was elongated a little (elongation of the heat-sealing resin was 3 mm or less from the edge surface upon tearing; refer to FIG. 1), tearing was easy"; and "x" means "the substrate was separated from the heat-sealing resin (LLDPE in that case) and the heat-sealing resin was elongated (elongation of the heat-sealing resin was 3 mm or more from the edge surface upon tearing) whereby resistance was noted and tearing was not possible)".

TABLE 2

| | | Ex. 1 | Ex. 2 | Ex. 3 | Ex. 4 | Ex. 5 |
|---|---|---|---|---|---|---|
| Composition of Adhesive (Ratio by Weight of Solid) | Poly-Urethane | Synth. Ex. 1 100 | Synth. Ex. 2 100 | Synth. Ex. 3 100 | Synth. Ex. 4 100 | Synth. Ex. 5 100 |
| | Silane Coupling Agent | A 2 | A 2 | A 2 | A 2 | — — |
| | Cross-linker | D 20 | D 20 | D 20 | D 20 | D 20 |
| Adhesive Strength (mN/15 mm) | | Materials Broken | Materials Broken | Materials Broken | Materials Broken | 2000 |
| Sealing Strength (N/15 mm) | | Materials Broken | Materials Broken | Materials Broken | Materials Broken | 45 |
| Tearing Property | | oo | oo | oo | oo | o |

| | | Ex. 6 | Ex. 7 | Ex. 8 | Ex. 9 | Ex. 10 |
|---|---|---|---|---|---|---|
| Composition of Adhesive (Ratio by Weight of Solid) | Poly-Urethane | Synth. Ex. 6 100 | Synth. Ex. 7 100 | Synth. Ex. 1 100 | Synth. Ex. 1 100 | Synth. Ex. 8 100 |
| | Silane Coupling Agent | A 2 | A 2 | B 2 | C 2 | A 2 |
| | Cross-linker | D 20 | D 20 | D 20 | D 20 | E 20 |
| Adhesive Strength (mN/15 mm) | | Materials Broken | Materials Broken | Materials Broken | Materials Broken | 1800 |
| Sealing Strength (N/15 mm) | | Materials Broken | Materials Broken | 45 | 43 | 45 |
| Tearing Property | | o | o | o | o | o |

| | | Comp. Ex. 1 | Comp. Ex. 2 | Comp. Ex. 3 | Comp. Ex. 4 | Comp. Ex. 5 |
|---|---|---|---|---|---|---|
| Composition of Adhesive (Ratio by Weight of Solid) | Poly-Urethane | Synth. Ex. 9 100 | Synth. Ex. 9 100 | Synth. Ex. 10 100 | Synth. Ex. 1 100 | Synth. Ex. 9 100 |
| | Silane Coupling Agent | A 2 | A 2 | A 2 | — — | — — |
| | Cross-linker | D 20 | E 20 | D 20 | D 20 | D 20 |
| Adhesive Strength (mN/15 mm) | | Materials Broken | Materials Broken | Materials Broken | 300 | 300 |
| Sealing Strength (N/15 mm) | | Materials Broken | Materials Broken | Materials Broken | 20 | 15 |
| Tearing Property | | x | x | x | oo | x |

Abbreviations in the tables are as follows.
Silane Coupling Agents
A: γ-Aminopropyl triethoxysilane (A-1100 manufactured by Nippon Unicar)
B: N-Phenyl-γ-aminopropyl trimethoxysilane (Y-9669 manufactured by Nippon Unicar)
C: γ-Glycidoxypropyl trimethoxysilane (A-187 manufactured by Nippon Unicar)
Crosslinkers
D: Crosslinker of a hexamethylene diisocyanate type (Coronate HX manufactured by Nippon Polyurethane Industry)
E: Crosslinker of a tolylene diisocyanate type (Coronate L manufactured by Nippon Polyurethane Industry)

As shown in the above Table 2, Examples 1–10 showed significantly high adhesive strength and sealing strength and good tearing property as compared with Comparative Examples 1–5. On the contrary, in Comparative Examples 1–5, adhesive strength, sealing strength and tearing property were not compatible.

What is claimed is:

1. An adhesive for an inorganic vapor-deposited film, comprising a compounded product or a reacted product of a polyurethane resin having a branch in a molecule with a silane coupling agent or mixtures of said compounded and reacted products, wherein a concentration of the branch of the polyurethane resin is 30–300 equivalents/ton.

2. The adhesive for an inorganic vapor-deposited film according to claim 1, wherein the polyurethane resin comprises about 15–95% by weight of a polyester polyol component having a glass transition temperature of 30° C. or higher based on the total weight of the polyurethane resin.

3. An adhesive for an inorganic vapor-deposited film, comprising a compounded product or a reacted product of a polyester resin having a branch in a molecule with a silane coupling agent, or mixtures of said compounded and reacted products, wherein a concentration of the branch of the polyester resin is 30–300 equivalents/ton.

4. The adhesive for an inorganic vapor-deposited film according to claim 1 or 3, wherein the silane coupling agent comprises an amino group.

5. The adhesive for an inorganic vapor-deposited film according to claim 1 or 3, further comprising an isocyanate crosslinker.

6. The adhesive for an inorganic vapor-deposited film according to claim 2, wherein the silane coupling agent comprises an amino group.

7. The adhesive for an inorganic vapor-deposited film according to claim 2, further comprising an isocyanate crosslinker.

8. The adhesive for an inorganic vapor-deposited film according to claim 4, further comprising an isocyanate crosslinker.

9. A compounded film wherein an inorganic vapor-deposited film and a heat-sealing resin film have been laminated to each other via an adhesive, wherein the adhesive comprises a compounded product or a reacted product of a polyurethane resin having a branch in a molecule with a silane coupling agent or mixtures of said compounded and reacted products, wherein a concentration of the branch of the polyurethane resin is 30–300 equivalents/ton.

10. The compounded film according to claim 9, wherein the branch concentration of the polyurethane resin is 30–300 equivalents/ton.

11. The compounded film according to claim 9 or 10, wherein the polyurethane resin comprises about 15–95% by weight of a polyester polyol component having a glass transition temperature of 30° C. or higher based on the total weight of the polyurethane resin.

12. A compounded film wherein an inorganic vapor-deposited film and a heat-sealing resin film have been laminated to each other via an adhesive, wherein the adhesive comprises a compounded product or a reacted product of a polyester resin having a branch in a molecule with a silane coupling agent, or mixtures of said compounded and reacted products, wherein a concentration of the branch of the polyurethane resin is 30–300 equivalents/ton.

13. The compounded film according to claim 9, 10 or 12, wherein the silane coupling agent comprises an amino group.

14. The compounded film according to claim 9, 10 or 12, further comprising an isocyanate crosslinker.

15. The compounded film according to claim 11, wherein the silane coupling agent comprises an amino group.

16. The compounded film according to claim 11, further comprising an isocyanate crosslinker.

17. The compounded film according to claim 13, further comprising an isocyanate crosslinker.

* * * * *